(12) United States Patent  
Olgaard et al.

(10) Patent No.: US 8,537,942 B2  
(45) Date of Patent: Sep. 17, 2013

(54) SYSTEM AND METHOD OF MAINTAINING CORRECTION OF DC OFFSETS IN FREQUENCY DOWN-CONVERTED DATA SIGNALS

(75) Inventors: Christian Volf Olgaard, Saratoga, CA (US); Ruizu Wang, San Ramon, CA (US); Erdem Serkan Erdogan, Sunnyvale, CA (US)

(73) Assignee: Litepoint Corporation, Sunnyvale, CA (US)

( * ) Notice: Subject to any disclaimer, the term of this patent is extended or adjusted under 35 U.S.C. 154(b) by 68 days.

(21) Appl. No.: 13/357,370

(22) Filed: Jan. 24, 2012

(65) Prior Publication Data

US 2013/0188678 A1    Jul. 25, 2013

(51) Int. Cl.  
*H04B 1/10* (2006.01)

(52) U.S. Cl.  
USPC .......... 375/346; 375/224; 375/316; 375/227; 375/228; 455/67.11; 455/67.13; 455/67.14; 455/68; 455/63.1; 455/115.1; 455/115.2

(58) Field of Classification Search  
USPC .......................... 375/346, 316, 224, 227, 228  
See application file for complete search history.

(56) References Cited

U.S. PATENT DOCUMENTS

| | | | |
|---|---|---|---|
| 4,833,676 A | 5/1989 | Koo | |
| 4,897,842 A | 1/1990 | Herz | |
| 5,138,608 A | 8/1992 | Kucera et al. | |
| 5,910,977 A | 6/1999 | Torresgrossa | |
| 6,753,693 B2 | 6/2004 | Seo et al. | |
| 6,870,392 B2 | 3/2005 | Kilian et al. | |
| 6,986,086 B2 | 1/2006 | Scholten | |
| 7,057,518 B2 | 6/2006 | Schmidt | |
| 7,463,140 B2 | 12/2008 | Schmidt | |
| 7,564,893 B2 | 7/2009 | O'Neill | |
| 7,817,998 B1* | 10/2010 | Tse et al. | 455/423 |
| 7,890,822 B2 | 2/2011 | Behziz et al. | |
| 2003/0202618 A1 | 10/2003 | Jensen et al. | |
| 2007/0275674 A1* | 11/2007 | Chien | 455/90.2 |
| 2007/0281655 A1 | 12/2007 | Ishikawa et al. | |
| 2008/0020746 A1* | 1/2008 | Alexandar et al. | 455/423 |

(Continued)

FOREIGN PATENT DOCUMENTS

| | | |
|---|---|---|
| JP | 2002-319989 A | 10/2002 |
| JP | 2005-278222 A | 10/2005 |

OTHER PUBLICATIONS

International Search Report and Written Opinion Dated Jan. 25, 2013 for PCT/US2012/063491; 9 Pages.

*Primary Examiner* — Siu Lee

(57) ABSTRACT

Circuitry and method for reduce test time for wireless signal systems by using dynamic adaptive correction of DC offsets generated by the test instrument. The data signal is sampled for downstream processing including during pre-, inter-, or post-packet time intervals where no packet-data signal is occurring and where the device's power amplifier is turned off. The sampled data signal is measured for a DC offset occurring during these inter-packet time gaps. Compensating DC offset values are stored in a table indexed by frequency, gain and temperature range. When a subsequent test is carried out at that frequency, gain, and temperature range, the stored compensation value is used to correct the signal. DC offsets continue to be measured, stored and applied to captured signals, continuously refining the compensation values and decreasing the need for time-intensive calibrations. When a measured DC offset exceeds pre-determined limits, the instrument undergo a calibration step.

12 Claims, 5 Drawing Sheets

(56) References Cited

U.S. PATENT DOCUMENTS

| | | | |
|---|---|---|---|
| 2009/0185079 A1* | 7/2009 | Yun et al. | 348/731 |
| 2010/0086086 A1* | 4/2010 | Rawlins et al. | 375/345 |
| 2010/0228515 A1* | 9/2010 | Srinivasan et al. | 702/124 |
| 2010/0261431 A1* | 10/2010 | Olgaard | 455/67.11 |
| 2011/0256838 A1* | 10/2011 | Donovan et al. | 455/127.2 |

* cited by examiner

_US 8,537,942 B2_

SYSTEM AND METHOD OF MAINTAINING CORRECTION OF DC OFFSETS IN FREQUENCY DOWN-CONVERTED DATA SIGNALS

BACKGROUND OF THE INVENTION

1. Field of the Invention

The present invention relates to systems and methods for testing wireless devices, and in particular to such systems and methods in which signals exhibit DC offsets requiring correction for proper testing.

2. Related Art

Many modern devices utilize wireless signals to send and receive data. Handheld devices in particular make use of wireless connections to provide features including telephony, digital data transfer, and geographical positioning. Although a variety of different wireless-connectivity capabilities are used (such as WiFi, WiMAX, and Bluetooth), in general each is defined by an industry-approved standard (such as IEEE 802.11, IEEE 802.16 and IEEE 802.15, respectively). In order to communicate using these wireless-connectivity capabilities, devices must adhere to the parameters and limitations specified by the associated standards.

Although differences exist between wireless communication specifications (for example, in the frequency spectra, modulation methods, and spectral power densities used to send and receive signals), almost all of the wireless connectivity standards specify the use of synchronized data packets to transmit and receive data. Furthermore, most devices adhering to these wireless communications standards employ transceivers to communicate; that is, they transmit and receive wireless radio frequency (RF) signals.

At any point along the device-development continuum, it may be necessary to test and verify that a device is operating according to the standards associated with its various communication capabilities. Specialized systems designed for testing such devices typically contain subsystems operative to communicate with a wireless communications device during a test. These subsystems are designed to test that a device is both sending and receiving signals in accordance with the appropriate standards. The subsystems must receive and analyze device-transmitted signals and send signals to the device that subscribe to industry-approved standards.

The testing environment generally consists of the device under test (DUT), the tester, and a computer. The tester is generally responsible for communicating with the DUT using a particular wireless communication standard. The computer and tester work together to capture a DUT's transmitted signals and then analyze them against the specifications provided by the underlying standard to test the DUT's transmission capabilities.

As is well known in the art, the time required to test a device has a linear relationship with the cost associated with conducting the test. Therefore, it is advantageous to reduce the amount of time required by a test, thereby increasing the throughput of each test system and lowering overall production costs. Several factors contribute to the total time required to test a device. These factors include the time spend handling a device, setting up the test, sending control signals from the tester to the device, capturing signals sent by the device, and analyzing those captured signals.

Test accuracy demands that the test system components responsible for determining signal frequencies and generating the various signal components are held to a high degree of accuracy, since these provide the references against which a DUT operating performance is determined. It is common in the art to perform calibrations of such components and their subsystems often enough to ensure that any imperfection in a mixer or preceding stage producing a DC offset is corrected by reducing or cancelling out such a DC offset. In some cases, test systems are programmed to perform a recalibration step whenever test frequencies are changed, since DC offset is usually frequency dependent. In many cases, though, such recalibration may be unwarranted because the DC offset is sufficiently low to preserve test accuracy within standard-specified limits.

Despite the advantages gained by reducing overall test time, the accuracy and validity of a test cannot be compromised. At a minimum, doing so would increase the rate of retesting necessary to evaluate a device, thereby increasing the total time required for testing. As such, methods for decreasing the time required to perform a test without eliminating necessary steps or compromising the integrity of the test are desired.

SUMMARY OF THE INVENTION

In accordance with the presently claimed invention, circuitry and method are provided for helping reduce test time for wireless signal systems. An embodiment of the presently claimed invention provides for the dynamic adaptive correction of DC offsets occurring in a data signal. The data signal is sampled for downstream processing at a time when there is no packet data signal (e.g. between packets) and where the device's power amplifier has either not yet turned on or has turned off, thereby ensuring that only the instrument-generated DC offset is measured. The signal—sampled in this inter-, pre-, or post-packet gap—is measured for its DC component. In the event that the instrument-generated DC level exceeds a predetermined level, DC offset correction is applied to the signal. In embodiments of the presently claimed invention, DC offset compensation values can be stored and retrieved to compensate subsequent signals sent using a similar gain, frequency, and/or temperature. In an embodiment of the presently claimed invention, the instrument is calibrated when the instrument-generated DC level exceeds a second predetermined level. Alternatively, the need for calibration can be reduced or eliminated through the use of adaptive dynamic DC offset compensation.

DETAILED DESCRIPTION

Figure 1:
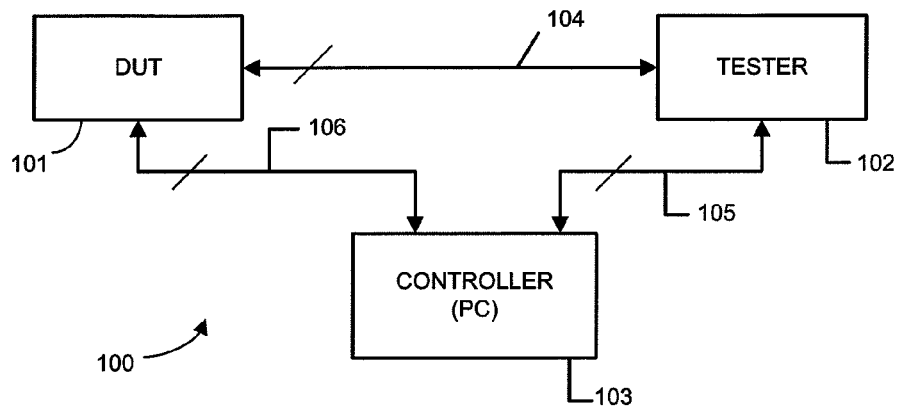
FIG. 1 is a functional block diagram of a conventional testing environment for a wireless data packet signal transceiver.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

In accordance with exemplary embodiments of the presently claimed invention, adaptive and dynamic compensation of instrument-generated DC offsets are realized. For example, a fast sampling of a small portion of the pre-test packet signal is obtained, followed by a quick analysis of the sample to determine if compensation is required. DC offset compensation can then be applied to the signal. As a result, DC offsets can be corrected without requiring the same expenditure of time as a traditional calibration. Similarly, a portion of the inter- or post-test packet signal could be used. A further benefit is the reduction (or elimination) of the need for time-intensive instrument calibrations. For example, in an embodiment of the presently claimed invention, calibrations are only performed when the measured DC offset becomes greater than a set threshold. As a result, overall test time will be reduced making the testing process more efficient without compromising test accuracy.

In a further embodiment, the number of necessary calibrations is further reduced by compensating for the instrument's generated DC offset using stored compensation values. Compensation values are initially calculated as described above using samples obtained from inter-, pre-, or post-packet gaps. These values are stored according to the settings used to transmit the signal (e.g., gain, frequency, and temperature). Subsequent sampled packets sent using similar settings are then adjusted according to these stored compensation values so as to eliminate or reduce the instrument-generated DC offset. Additionally, the DC offset in these subsequent signals can be measured to ensure the stored values remain accurate. If necessary, the stored values can be updated and further compensation can be applied. Alternatively, the test instrument can be calibrated if DC offsets exceed a set threshold.

Referring to FIG. 1, a conventional test system 100 for testing a device against a wireless standard would include a device-under-test (DUT) 101, a tester 102, and a computer (PC) controller 103 that executes the test program and coordinates the operation of the DUT 101 and the tester 102. They are linked by bidirectional communications pathways 104, 105, 106 that can be any form of communications link (e.g., Ethernet, universal serial bus (USB), serial peripheral interface (SPI), wireless interfaces, etc.). These interfaces 104, 105, 106 may be composed of one or more data channels. For example, interface 104 could be a multiple input, multiple output (MIMO) type link (e.g., as in the IEEE 802.11n wireless standard) or a single input, single output (SISO) type link (e.g., as in the IEEE 802.11a wireless standard). Other possible communications links will be clear to one of ordinary skill in the art. In such a system, the tester 102 sends test signals to the DUT 101 over a bidirectional interface 104. The DUT 101 will also transmit signals to the tester 102 using the same bidirectional interface 104. The control computer 103 executes a test program and coordinates the operation of the DUT 101 and tester 102 via interfaces 105 and 106.

As will be readily appreciated by one of ordinary skill in the art, the signal interface 104 between the DUT 101 and the tester can be an over-the-air (wireless) connection or a wired connection (e.g., a cable) using the circuit interface for connecting to the antenna(s). Often, for testing purposes, such wired connections are used to ensure signal consistency.

In a typical test, the DUT 101 would transmit a signal to the tester 102 via its communications pathway 104. The tester 102 would receive that signal, measure its characteristics, and analyze its measured characteristics against a set of specifications specific to a particular wireless standard (e.g., IEEE 802.11g). The DUT 101 would, under control of the controller 103, continue to send a variety of signals having many or all the different characteristics prescribed by the standard to which it subscribes. The tester 102 would perform measurements and analyses commensurate with the test specifications prescribed by the applicable wireless standard. As such, the test system 100 would carry out the necessary prescribed tests related to the signals to be transmitted by the DUT 101. These tests would confirm that the DUT transmitter is operating in accordance with the standard to which it subscribes. To test the DUT receiver, the tester 102 would transmit a signal over the pathway 104 in accordance with the testing program being executed by the controller 103. The controller 103 would instruct the tester 102 regarding signal frequencies, power, modulation and other signal characteristics prescribed by the standards to which the DUT 101 subscribes. The DUT receiver would receive those signals and its response would determine whether it was operating properly per the specifications of the standards.

Figure 2:
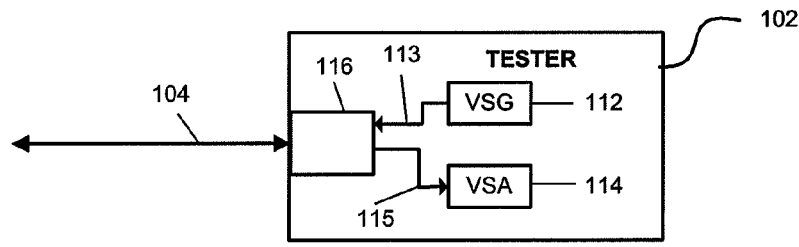
FIG. 2 is a functional block diagram of a conventional tester for a wireless data packet signal transceiver.

Referring to FIG. 2, the tester 102 typically includes a vector signal generator VSG 112 for providing transmitted test signals 113 to be sent to the DUT 101 (e.g., via a signal router or switch 116) as well as a vector signal analyzer VSA 114 for capturing the DUT signals 115 (e.g., via the signal router or switch 116) for analysis. Both the characteristics of the transmitted test signals 113 and the ability of the tester 102 to accurately capture and analyze signals 115 received from DUT 101 are determined by the accuracy of the operation and continued calibration of the VSG 112 and VSA 114, respectively. As is well known, the VSG 112 and VSA 114 contain circuitry that supports transmission and reception, respectively, of radio frequency (RF) signals having quadrature modulation characteristics (e.g., in-phase I and quadrature-phase Q signal components).

Figure 3:
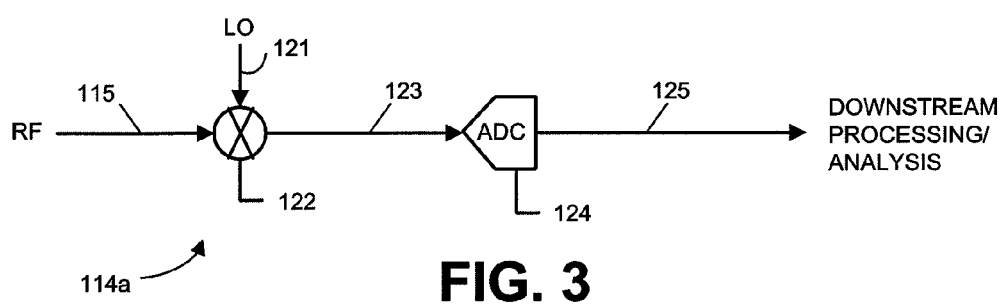
FIG. 3 is a functional block diagram of a conventional technique for frequency down-conversion and sampling of a data packet signal for downstream processing and analysis.

Referring to FIG. 3, conventional techniques down convert the frequency of the incoming data signal 115 with a local oscillator (LO) signal 121 by mixing these signals 115, 121 in a mixer 122. The frequency down converted signal 123 is then sampled by being converted to a corresponding digital signal 125 by an analog-to-digital converter (ADC) 124, in accordance with well known techniques. However, as is well known in the art, increased data rates result in increased signal bandwidth. Accordingly, measuring such signals requires test equipment having wider bandwidths for receiving and capturing the data signals. As bandwidths increase further, it becomes increasingly difficult to accommodate the wider bandwidths using a single ADC 124.

Figure 4:
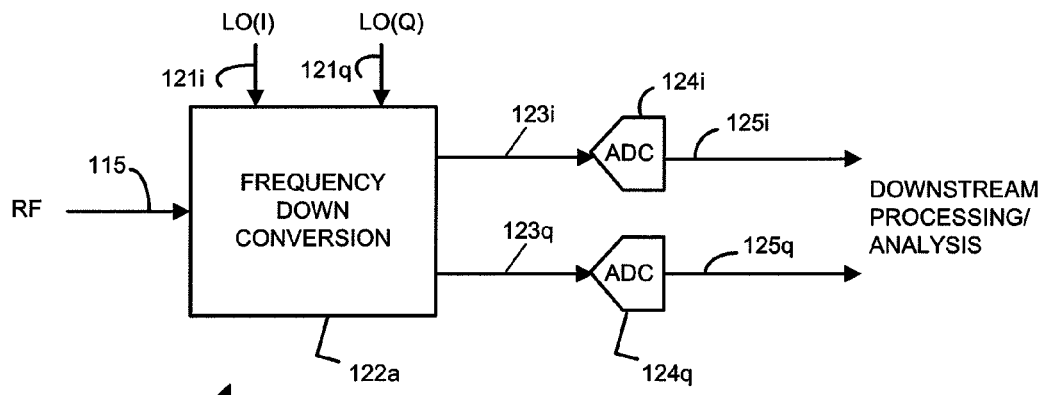
FIG. 4 is a functional block diagram of another conventional technique for frequency down-conversion and sampling of a data packet signal for downstream processing and analysis.

Referring to FIG. 4, the bandwidth of the sampling circuitry can be effectively doubled by using quadrature frequency down conversion prior to sampling. The incoming data signal 115 is frequency down converted using quadrature LO signals 121i, 121q in quadrature frequency down conversion circuitry 122a, various architectures of which are well known in the art. The resulting in-phase 123i and quadrature phase 123q frequency down converted signals are filtered (not shown) and then sampled as before using respective ADC circuits 124i, 124q to produce quadrature sampled signals 125i, 125q for downstream processing and analysis (not shown).

However, such frequency down-conversion techniques suffer from LO signal leakage, particularly with quadrature frequency down conversion. As is well known, such LO signal 121i, 121q leakage appears in the frequency down converted signals 123i, 123q as a non-zero DC voltage offset, plus a mixing product signal at twice the frequency of the nominal frequency of the down converted signals 123i, 123q. The mixing product signal normally falls outside the bandwidth of the test equipment and is, therefore, generally of minor (if any) concern. However, correction is needed for the DC offset voltage, and it can be provided using various techniques that are well known in the art.

Traditionally, one way of eliminating the DC offset in measurement instruments, is to sample a down-converted signal at an intermediate frequency (IF). This has the desirable property that the resulting DC offset produced by the down-conversion mixer falls outside the frequencies of the signal of interest, and thus can easily be filtered. However, when compared to an IQ (quadrature-sampled) down conversion, IF-sampled systems require a higher sampling rate to support a given signal bandwidth (BW). Furthermore, the filtering needed in an IF-sampled system is more complex and provides no BW benefits. However, one of the downsides of using IQ sampling is that the generated DC signal from the down-conversion now resides as part of the signal. Consequently, the DC signal generated by the instrument is added to the received signal, affecting the true representation of the received signal unless the instrument DC component is much smaller than the DC component of the received signal.

A feedback scheme for automatically reducing the DC leakage has been commonly used in integrated circuits to cope with DC leakage generated by IQ down-conversion mixers. For example, a feedback scheme can be used to control the level of a compensating DC voltage injected at the output of an IQ down-conversion mixer to ensure that no DC component is amplified by the gain typically introduced in the baseband portion of the receiver. However, such feedback schemes typically require substantial periods of time to fully compensate for DC leakage.

For measurement systems, it is often desirable to maximize the dynamic range and signal-to-noise ratio (SNR). As such, the analyzed signal will generally utilize the full signal range of the baseband signal. This is usually close to full scale at the output of the IQ down conversion mixer. Thus, measurement systems are less sensitive to DC leakage because the generated DC leakage is typically not further amplified beyond the output of the IQ down conversion mixer. However, because measurement equipment must accurately measure and analyze a received signal, it is important that the instrument DC leakage be significantly lower than the signal being measured (generally at least 10 dB lower). As a result, the instrument must compensate for the generated DC leakage to ensure the desired testing performance.

In integrated solutions (e.g., integrated circuits), feedback schemes can be used because the receiver will typically receive signals for a long time period relative to the feedback time constants. However, for measurement instruments, especially those used in a manufacturing test scenario, often only one or a few packets are received before the operating conditions are changed. In such cases, the instrument does not have time for traditional feedback schemes to compensate the instrument-generated DC leakage.

Therefore, to obtain the desired test measurement accuracy, a true DC leakage calibration is often performed prior to capturing a signal for analysis. However, performing a complete instrument calibration before each measurement is not desirable due to the time consumed by the calibration. To avoid the added time without compromising test accuracy, a method for adaptive calibration is presently presented which ensures desired performance but does not consume unnecessary time. Additionally, a method for compensating for an instrument-generated DC offset is provided, thereby reducing the frequency of required calibrations or eliminating the need for test instrument calibration entirely.

Figure 5:
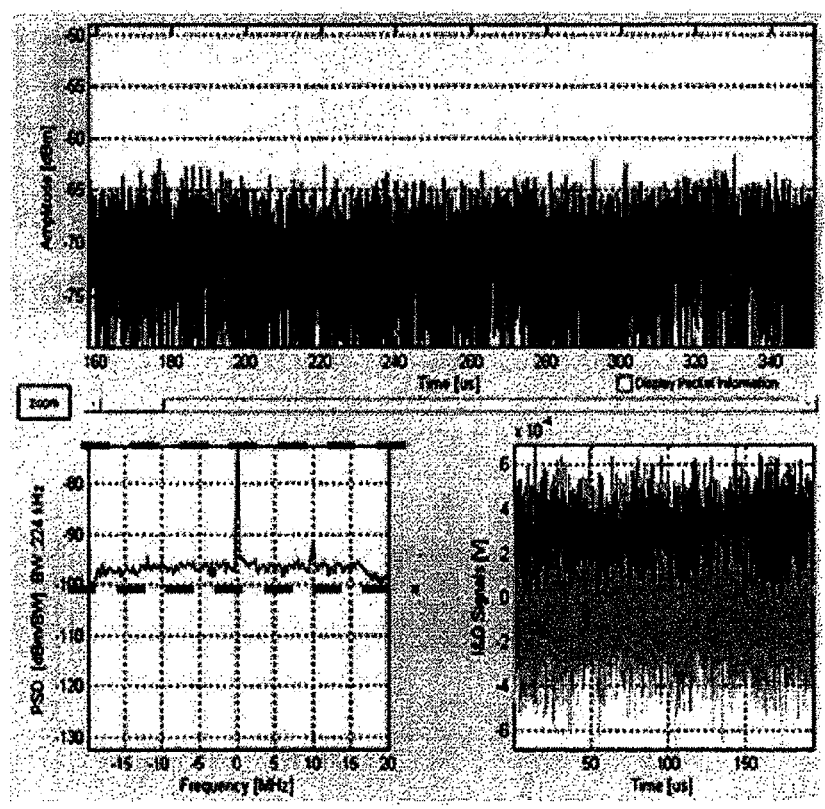
FIG. 5 is a set of signal diagrams illustrating DC offset for the circuitry of FIG. 4.

Referring to FIG. 5, under typical desirable test conditions, nominal LO signal leakage will be such that the quadrature data signals I, Q will have approximately zero DC offset voltage.

Figure 6:
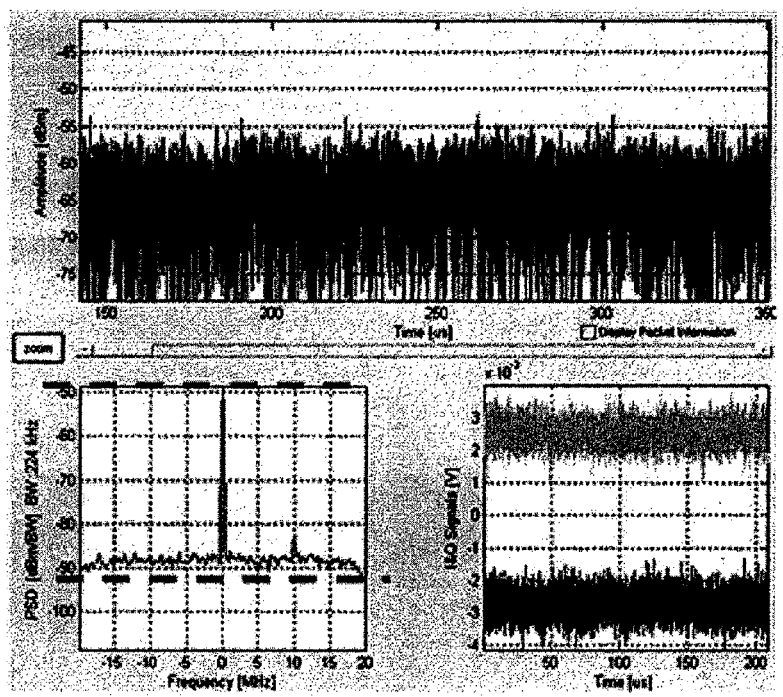
FIG. 6 is a set of signal diagrams illustrating DC offset for the circuitry of FIG. 4.

Referring to FIG. 6, under degraded testing conditions, increased DC offset occurs on the signal. This DC offset can be caused for example by non-optimal operation of the down converter and the subsequent baseband circuits. It is clear to one skilled in the art that the signal can be centered around zero by subtracting the offset from the signal. It is also clear that by knowing both the DC levels compared to the expected signal level at the analog-to-digital converter, a direct indication of the DC leakage is provided. Based on these levels, it can be determined if either a calibration is needed or the current DC level is acceptable for the specified measurement.

Typical DC offset correction techniques influence or control the frequency down conversion operation such that the LO signal leakage is made sufficiently small so as to have minimal effect on the converted signal 123i, 123q. Accordingly, periodic calibration becomes important to perform this correction in such a manner as to maintain acceptable LO signal leakage. However, LO signal leakage is typically dependent upon signal frequencies, signal levels (gain) in the receiver, and operating temperatures. Accordingly, such DC voltage offset calibration systems must perform this calibration whenever changing frequencies or gains. Additionally, even without a change in frequency or gain, the calibration must be performed at regular predetermined time intervals to account for changes in LO signal leakage, for example due to fluctuations in the operating temperature of the equipment. Such predetermined time intervals must be chosen such that the worst-case performing test equipment will be able to maintain sufficiently low LO signal leakage levels. Accordingly, since the calibration time interval is defined by the worst-case test equipment performance, typical test equipment implementations will often be performing such calibrations more frequently than necessary, thereby unnecessarily adding to overall test time and decreasing test efficiency.

Figure 7:
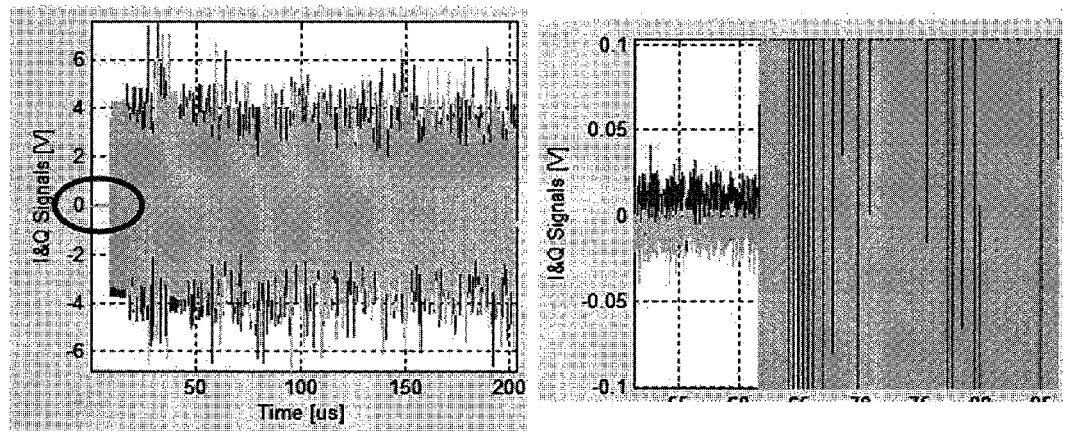
FIG. 7 shows the signal (left) during data packet transmission along with an enlargement (right) of the instrument's DC offset during the gap prior to transmission.

Referring to FIG. 7, a portion of a test signal is shown, including the gap prior to the test packet. As the signal received for analysis may have its own level of DC offset, the instrument-generated DC offset cannot be determined during the transmission of packets. Instead, the measurement instrument must determine the DC offset when no input signal is present. Therefore, the instrument must be able to determine a period of time when the instrument-generated DC leakage dominates the received signal. In addition, communication systems analyzed by the instrument often exhibit a DC offset in an IQ down conversion mixer system both before and after the actual packet is sent because the Power Amplifier (PA) is enabled without an input signal. This is done for example to ensure the PA is working correctly throughout the entire transmitted packet.

To ensure optimal DC offset compensation, an embodiment of the presently claimed invention intelligently measures the instrument-generated DC offset during periods where no input signal is present and the PA is inactive. For example, embodiments of the presently claimed invention provide for measuring the instrument-generated DC offset during gaps between packets and before and after the PA is enabled. In one embodiment, the input signal can be suppressed during the gap between packets to allow for accurate measurements of the DC offset if the PA is not otherwise disabled.

The beginning of a packet can be easily identified by a positive-going trigger; thus, a desired pre-trigger time can be used to determine a point in time preceding transmission to measure the instrument DC offset. For example, a pre-trigger time can be selected to ensure a packet is not being sent and that the PA has not been enabled. Otherwise, the instrument can increase the attenuation of the input to negate the effect of the PA. Alternatively, a measurement point can be determined by detecting a negative-going trigger event (indicating the end of a packet) and adding a delay to allow the PA to turn off and/or the instrument attenuation to be increased.

Accordingly, the signal captured during the gap between packets can be used to determine the DC offset for both the I and Q paths individually. These offsets can then be used to determine a correction factor for a subsequently captured packet to ensure close-to-optimal performance. One skilled in the art will realize that averaging and filtering of the derived DC offset compensation parameters may be used to ensure stable and predictable DC offset compensation.

Because DC offset generally depends on instrument frequency and gain, and in some cases may depend on system temperature, a list/look up table (LUT) is used in one embodiment of the presently claimed invention to store individual DC offset compensation values indexed for each frequency/gain/temperature set (e.g., of values or ranges of values). This approach is particularly beneficial in manufacturing where test time becomes very critical, and where all devices being tested are exposed to the same test sequence. In such cases, a predefined and limited number of compensation values based on frequency/gain/temperature will be used by the instrument.

Figure 8:
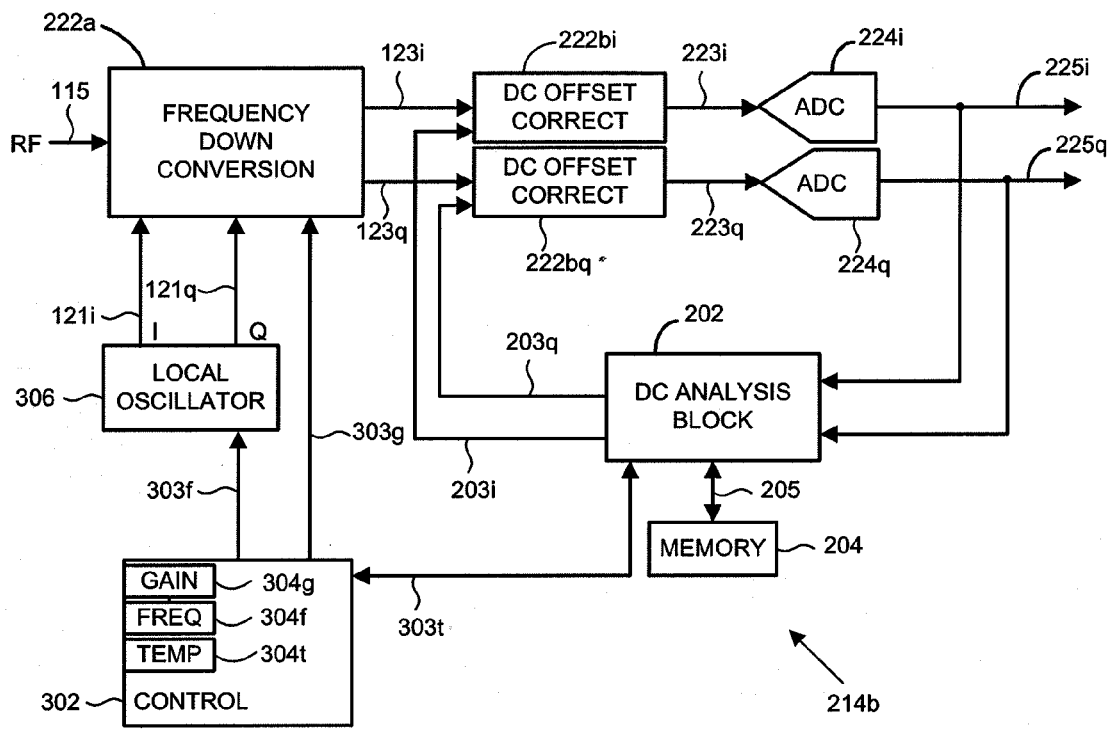
FIG. 8 is a functional block diagram of circuitry in accordance with one embodiment of the presently claimed invention for maintaining correction of DC offsets occurring in a frequency down converted data signal due to instrument-generated DC leakage.

Referring to FIG. 8, one conceptual implementation of the DC compensation circuit is shown. The down-conversion IQ mixer (222a) down-converts the RF signal 115 using quadrature LO signals (121i and 121q). The filtered baseband signals (123i and 123q) are corrected for DC offset within the down conversion stage 222a or in respective DC offset correction circuitry 222bi, 222bq (discussed in more detail below). The resulting offset-corrected baseband signals (223i and 223q) are converted to digital domain using analog to digital converters (224i and 224Q). The digital representations of the down-converted signals (225i and 225q) are passed on for further processing downstream.

A control unit 302 (e.g., the main processor or controller for the host system, or a dedicated microcontroller) provides the necessary control signal(s) 303f for controlling the frequency of the LO signals 121i, 121q provided by the local oscillator circuitry 306 for properly down converting the frequency of the RF signal 115, and control signal(s) 303g for controlling the gain of the down conversion stage 222a. A a communications interface 303t with the DC analysis block 202 is also provided for communicating with the DC analysis block 202 to provide gain data 304g corresponding to the gain of the down conversion stage 222a, frequency data 304f corresponding to the frequency of the LO signals 121i, 121q (and, therefore, also to the frequency of the RF signal 115), and temperature data 304t (e.g., obtained using temperature sensing circuitry (not shown) within the host system).

This processing may remove the actual instrument-generated DC offset from the signal so long as the DC leakage of the instrument can be determined by measuring the DC leakage present in the gap between packets as discussed for FIGS. 5 and 6. The digital representation is further passed into the DC analysis block 202. This block includes memory 204 where compensation values from previous gain settings can be stored (e.g. in a LUT) for use for the next capture at that same frequency, temperature (range) and gain setting. The block 202 determines the DC leakage of the instrument by determining the DC leakage of the instrument in the I channel 225i and the Q channel 225q. The block 202 will determine where, in the capture, the instrument DC offset for the two channels can be determined, and process the DC value to determine if the stored compensation values needs to be updated or if they are acceptable. Optionally, the block 202 can determine if a calibration is needed, for example due to the measured DC offset exceeding a set threshold. The memory block 204 attached to the DC measurement block 202 connected through interface 205 allows separate correction values based on temperature, down-conversion gain of the down-conversion mixer 222, and the frequency of the LO signals 121i, 121q. Multiple correction factors can be stored allowing averaging for each point to be included if deemed necessary. Optionally, analysis can be performed on the stored values to evaluate the instrument's performance over time and for example determine when a calibration is needed or other maintenance on an instrument is required.

As will be recognized by one of ordinary skill in the art, other conceptual arrangements can also be used to practice embodiments of the present invention. For example, a controller could be connected to some or all of the elements shown in FIG. 8. Similarly, the memory 204 could be directly linked to the DC offset correction circuitry 222 or to the controller. DC offset correction could similarly be performed after the test signal has been sampled by ADC 224.

Figure 9:
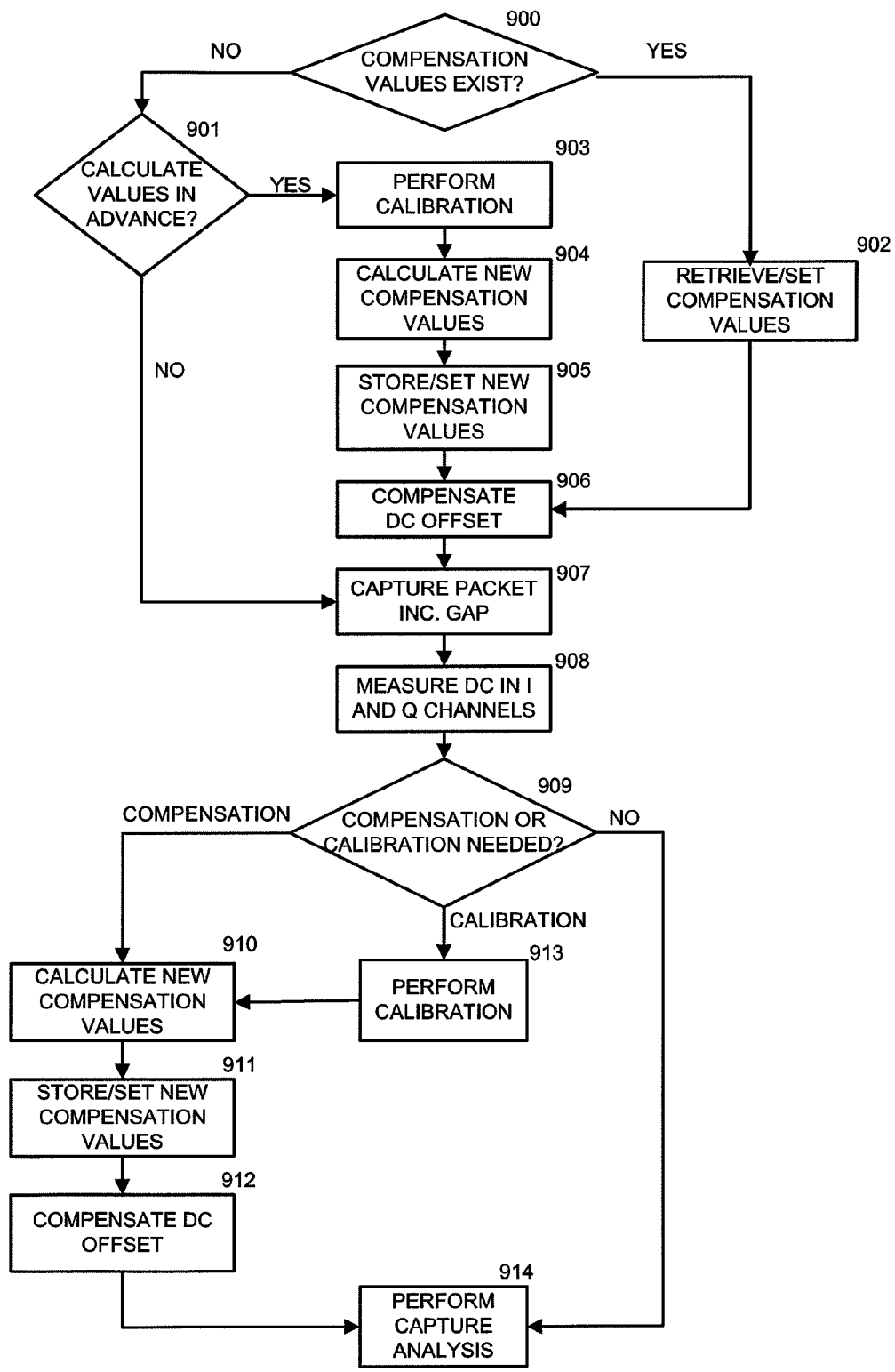
FIG. 9 is a flow diagram showing the steps involved in compensating for DC offset or determining that a calibration is required.

Referring to FIG. 9, a flow chart depicting a possible operation of an exemplary embodiment of the present invention is shown. When a capture is scheduled, a check is performed at step 900 to determine if compensation values exist for the given parameters of the operating environment of the test (e.g., the current packet data signal frequency, signal gain and system operating temperature). If suitable compensation parameters already exist, they are retrieved 902 from memory 204. If no suitable values already exist in memory 204, a decision 901 is made to either calculate compensation values before or after performing the capture. If values are not to be calculated in advance, the method proceeds to capture 907 at least a portion of a test signal. Otherwise, a calibration is performed 903 and new compensation values are calculated 904 and stored 905 in memory 204. If compensation values exist (either from being calculated at step 904 or retrieved at step 902), appropriate compensation is applied 906, e.g., via interfaces 203*i*, 203*q* to DC offset correction circuitry 222*bi*, 222*bq* implemented in accordance with well known techniques, or, alternatively via interfaces (not shown) to a DC offset correction input of the down-conversion mixer 122 (FIG. 3) within the down conversion stage 222*a*, or. Following this, a test signal is captured 907. The capture includes a gap where the DC offset analysis block 202 can determine the instrument's DC offset as discussed above, that is, at a gap between packets or before or after one or more packets are transmitted. Optionally, the input can be suppressed (e.g., if the PA remains active) to enable an accurate measurement of the DC offset to be obtained. The DC compensation block 202 will then determine the instrument's DC offset 908. If a significant DC offset is found 909, new compensation values are calculated 910. This can be done in many ways. One method would be to use the current measured DC value to determine the correction factor necessary to obtain an appropriate DC offset, for example based on extrapolated characterization of the down conversion mixer's DC compensation control input. Of course, more advanced methods may determine correction values using the history of previous measurements, allowing an adaptive and more accurate compensation of the measured DC leakage in each of the I and Q channels. These values are then stored 911 in memory 204 to compensate subsequent captures using the same (or similar) gain, frequency, and/or temperature parameters. The value of the DC offset can optionally be used to compensate the currently captured test signal 912 after which the analysis of the desired signal is performed 914. At the same point in the flow 909, based on the observed instrument DC offset it can be determined if a DC calibration is required, where, for example, one or both DC values exceed a predetermined threshold. If this is the case, a calibration is performed 913 and the resulting compensation values are determined 910 and stored 911 in memory 204, such that next time the instrument is operated with the same (or similar) frequency, gain and temperature range parameters, the new values will be selected. The method concludes by optionally performing analysis 914 on the captured signal. Alternatively, the captured signal could be stored for later analysis.

It will be readily appreciated by one of ordinary skill in the art that the DC analysis block 202 can be implemented in accordance with well known techniques, including, for example, summing circuitry or circuitry implementing a Fast-Fourier Transform to combine the down-converted data signal with the DC compensation data.

As will be clear to one of ordinary skill in the art, other operations are possible. For example, more advanced operations could be included where if an instrument has not used a gain/frequency/temperature set for a predefined time period, a calibration is forced before capture is performed. Similarly, if the results from previous compensations are utilized to determine new compensation values, an adaptive correction algorithm can be implemented to ensure close-to-ideal operation, as the down conversion mixer's DC compensation control input performance can be characterized. Of course, other algorithms can be employed as one skilled in the art will realize. However, the common feature for all of these algorithms is the ability to determine the instrument's inherent DC offset as part of the capture, and then use that information for present and future compensation values.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for correcting for DC offset in a data packet signal received by a data packet signal receiver, comprising:
    receiving, from a device under test (DUT), a packet data signal with the data packet signal receiver having a plurality of operating environment parameters including one or more of signal frequency, signal gain and operating temperature;
    if compensation data corresponding to said plurality of operating environment parameters is available, then
        compensating, within said data packet signal receiver, said received packet data signal with said compensation data, and
        measuring a DC signal voltage during a gap between adjacent data packets in said received packet data signal to provide a measured DC voltage signal; and
    if said compensation data corresponding to said plurality of operating environment parameters is not available, then
        calibrating said data packet signal receiver to provide said compensation data,
        compensating said received packet data signal with said compensation data, and
        measuring a DC signal voltage during a gap between adjacent data packets in said received packet data signal to provide a measured DC voltage signal.

2. The method of claim 1, wherein:
    said measured DC voltage signal has a first value;
    said method comprises repeating said compensating, measuring and calibrating of claim 1;
    said measured DC voltage signal of said repeated compensating, measuring and calibrating of claim 1 has a second value; and
    said second value is less than said first value.

3. The method of claim 1, wherein:
    said measured DC voltage signal has a first value;
    said method comprises repeating at least said compensating and measuring of claim 1;
    said measured DC voltage signal of said repeating at least said compensating and measuring of claim 1 has a second value; and
    said second value is less than said first value.

4. The method of claim 1, wherein said measuring a DC signal voltage during a gap between adjacent data packets in said received packet data signal to provide a measured DC voltage signal comprises:
    capturing a portion of said packet data signal including at least respective portions of each one of a plurality of data packets and a gap among said plurality of data packets to provide captured packet data signal portions and a captured packet data signal gap; and
    detecting a DC voltage in said captured packet data signal gap to provide said measured DC voltage signal.

5. The method of claim 1, wherein said measuring a DC signal voltage during a gap between adjacent data packets in said received packet data signal to provide a measured DC voltage signal comprises:
   capturing a portion of said packet data signal including at least said gap between adjacent data packets to provide a captured packet data signal gap; and
   detecting a DC voltage in said captured packet data signal gap to provide said measured DC voltage signal.

6. The method of claim 1, wherein said calibrating said data packet signal receiver to provide said compensation data comprises detecting a change in one or more of said plurality of operating environment parameters.

7. The method of claim 1, wherein said calibrating said data packet signal receiver to provide said compensation data comprises updating said compensation data corresponding to one or more of said plurality of operating environment parameters.

8. The method of claim 1, wherein said calibrating said data packet signal receiver to provide said compensation data comprises storing said compensation data in memory.

9. The method of claim 1, further comprising one of:
   calibrating and compensating by
      calibrating said data packet signal receiver to provide updated compensation data, and
      compensating said received packet data signal with said updated compensation data; and
   compensating by
      computing new compensation data, and
      compensating said received packet data signal with said new compensation data.

10. The method of claim 9, further comprising storing at least one of said updated compensation data and said new compensation data in memory.

11. The method of claim 9, further comprising:
   capturing a portion of said packet data signal including at least respective portions of each one of a plurality of data packets and a gap among said plurality of data packets to provide captured packet data signal portions and a captured packet data signal gap; and
   detecting a DC voltage in said captured packet data signal gap to provide said measured DC voltage signal.

12. The method of claim 9, further comprising:
   capturing a portion of said packet data signal including at least said gap between adjacent data packets to provide a captured packet data signal gap; and
   detecting a DC voltage in said captured packet data signal gap to provide said measured DC voltage signal.

* * * * *